US012516779B2

(12) United States Patent
Graci et al.

(10) Patent No.: US 12,516,779 B2
(45) Date of Patent: Jan. 6, 2026

(54) PRESSURE VESSEL SYSTEM COMPRISING A PLURALITY OF PRESSURE VESSELS, AND MOTOR VEHICLE

(71) Applicant: Bayerische Motoren Werke Aktiengesellschaft, Munich (DE)

(72) Inventors: Lydia Moral Graci, Munich (DE); Klaus Szoucsek, Zirndorf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/726,158

(22) PCT Filed: Jan. 25, 2023

(86) PCT No.: PCT/EP2023/051764
§ 371 (c)(1),
(2) Date: Jul. 2, 2024

(87) PCT Pub. No.: WO2023/144188
PCT Pub. Date: Aug. 3, 2023

(65) Prior Publication Data
US 2025/0067401 A1 Feb. 27, 2025

(30) Foreign Application Priority Data
Jan. 26, 2022 (DE) ...................... 10 2022 101 769.9

(51) Int. Cl.
*F17C 13/08* (2006.01)
*B60K 15/03* (2006.01)
*B60K 15/07* (2006.01)

(52) U.S. Cl.
CPC ............ *F17C 13/084* (2013.01); *B60K 15/07* (2013.01); *B60K 2015/03118* (2013.01);
(Continued)

(58) Field of Classification Search
CPC .............. F17C 13/084; F17C 2201/035; F17C 2203/0604; F17C 2205/013;
(Continued)

(56) References Cited

U.S. PATENT DOCUMENTS 5,443,578 A * 8/1995 Davis, Jr. ......... B60K 15/03006
280/830
7,189,040 B2 * 3/2007 Sharp ..................... B60R 19/00
410/42
(Continued)

FOREIGN PATENT DOCUMENTS

DE 10 2005 037 637 A1 4/2006
DE 10 2014 207 555 A1 10/2015
(Continued)

OTHER PUBLICATIONS

International Search Report (PCT/ISA/210) issued in PCT Application No. PCT/EP2023/051764 dated May 8, 2023 with English translation (7 pages).
(Continued)

*Primary Examiner* — Patrick C Williams
(74) *Attorney, Agent, or Firm* — Crowell & Moring LLP

(57) ABSTRACT

A pressure vessel system for a motor vehicle comprises a plurality of pressure vessels for storing fuel. The pressure vessels are generally provided in the underfloor region of the motor vehicle, and the longitudinal axes of these vessels are expediently parallel to one another. At least one pressure vessel of the plurality of pressure vessels is a reinforced pressure vessel. At least one other pressure vessel of the plurality of pressure vessels is a reinforcement-free pressure vessel.

9 Claims, 1 Drawing Sheet

(52) U.S. Cl.
CPC ............... *F17C 2201/035* (2013.01); *F17C 2203/0604* (2013.01); *F17C 2205/013* (2013.01); *F17C 2270/0168* (2013.01)

(58) Field of Classification Search
CPC ............ F17C 2270/0167; B60K 15/07; B60K 2015/03118
See application file for complete search history.

(56) References Cited

U.S. PATENT DOCUMENTS

| | | | |
|---|---|---|---|
| 10,486,530 | B2 | 11/2019 | Matijevich et al. |
| 2006/0032532 | A1 | 2/2006 | Suess et al. |
| 2009/0152043 | A1* | 6/2009 | Lee ................. B60K 15/07 280/834 |
| 2017/0343162 | A1* | 11/2017 | Yersak ................. F17C 13/083 |
| 2020/0180445 | A1 | 6/2020 | Kataoka |
| 2023/0053395 | A1 | 2/2023 | Graci et al. |
| 2023/0332750 | A1 | 10/2023 | Bartl et al. |
| 2023/0408040 | A1 | 12/2023 | Gutmann |

FOREIGN PATENT DOCUMENTS

| | | |
|---|---|---|
| DE | 10 2017 111 500 A1 | 11/2017 |
| DE | 10 2018 215 447 B3 | 10/2019 |
| DE | 10 2019 132 060 A1 | 5/2021 |
| DE | 10 2020 103 155 A1 | 8/2021 |
| DE | 10 2020 123 037 A1 | 3/2022 |
| DE | 10 2020 128 607 A1 | 5/2022 |
| JP | 2017-100514 A | 6/2017 |
| JP | 6323369 B2 | 5/2018 |
| JP | 6688474 B2 | 4/2020 |
| WO | WO 2021/104825 A1 | 6/2021 |
| WO | WO 2021/177953 A1 | 9/2021 |

OTHER PUBLICATIONS

German-language Written Opinion (PCT/ISA/237) issued in PCT Application No. PCT/EP2023/051764 dated May 8, 2023 with English translation (11 pages).
German-language Search Report issued in German Application No. 10 2022 101 769.9 dated Jan. 18, 2023 with partial English translation (11 pages).

* cited by examiner

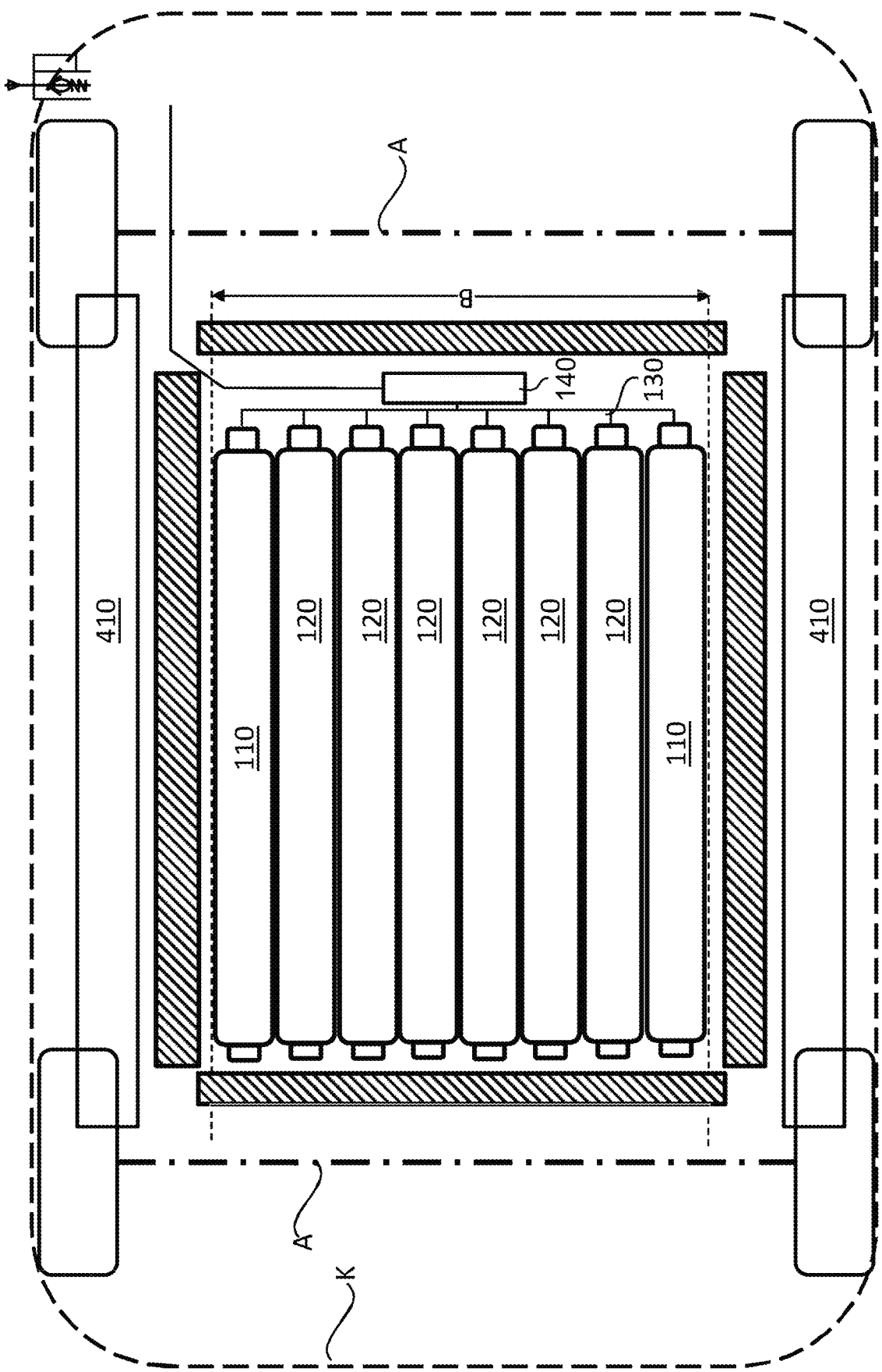

PRESSURE VESSEL SYSTEM COMPRISING A PLURALITY OF PRESSURE VESSELS, AND MOTOR VEHICLE

BACKGROUND AND SUMMARY

The technology disclosed herein relates to a pressure vessel system comprising a plurality of different pressure vessels, and a motor vehicle.

Underfloor pressure vessel systems which comprise a plurality of identical pressure vessels for storing fuel are known from the prior art. There is an endeavor to improve these pressure vessel systems further in respect of storage volume, costs, weight and safety, with the intention at the same time being for the pressure vessel system to be able to be integrated in the same construction space as the high-voltage storage systems of other vehicle derivatives, for example of vehicles operated purely by battery.

It is an object of the technology disclosed herein to reduce or to eliminate at least one disadvantage of a previously known solution or to propose an alternative solution. It is in particular an object of the technology disclosed herein to improve underfloor pressure vessel systems in respect of storage volume, costs, weight and/or safety. Further objects may arise from the advantageous effects of the technology disclosed herein.

An object is achieved, inter alia, by a pressure vessel system for a motor vehicle. The pressure vessel system comprises a plurality of pressure vessels for storing fuel. At least one pressure vessel of the plurality of pressure vessels is a reinforced pressure vessel. At least one other pressure vessel of the plurality of pressure vessels is a reinforcement-free pressure vessel.

The technology disclosed herein relates to a pressure vessel system for a motor vehicle (e.g. passenger motor vehicles, motorcycles, utility vehicles). The pressure vessel system serves to store fuel which is gaseous under ambient conditions. The pressure vessel system may, for example, be used in a motor vehicle which runs on compressed natural gas (CNG) or liquid natural gas (LNG) or hydrogen. The pressure vessel system is fluidically connected to at least one energy converter, which is designed to convert the chemical energy of the fuel into other forms of energy.

The pressure vessel system may for example be a cryogenic pressure vessel or a high-pressure gas vessel. High-pressure gas vessels are designed to store fuel over long periods of time at a nominal working pressure (NWP) of at least 350 bar (g) (=gage pressure above atmospheric pressure) or at least 700 bar (g) at ambient temperatures. A cryogenic pressure vessel is suitable for storing the fuel at the aforementioned operating pressures even at temperatures which lie significantly (e.g. more than 50 Kelvin or more than 100 Kelvin) below the operating temperature of the motor vehicle.

The pressure vessel system comprises a plurality of pressure vessels. Preferably, the pressure vessel system comprises more than 5 or more than 7 or more than 10 pressure vessels. The pressure vessel system is expediently provided in the underfloor region. The underfloor region is the region of the motor vehicle which is provided below the passenger compartment and expediently between the wheels of the motor vehicle. A high-voltage storage system for battery-operated vehicles is generally also integrated in this construction space. Therefore, the same body can be used for vehicles operated on the basis of fuel cells and for battery-operated vehicles.

Preferably, a pressure vessel assembly (also called "container assembly") can have the plurality of pressure vessels and supporting, fastening and/or protective elements (e.g. protective shields, screens, barrier layers, coverings, coatings, wrappings, etc.) connected permanently to the pressure vessels. The supporting, fastening and/or protective elements can expediently be removed only temporarily and preferably only by qualified personnel and/or not without being destroyed. Such a pressure vessel assembly is suitable particularly for flat installation spaces, in particular in the underfloor region. The pressure vessel assembly can preferably be able to be mounted as a whole in the installation space provided in the motor vehicle. For this purpose, the pressure vessel assembly can have common body attachment points, by way of which the system as a whole is fastenable in the motor vehicle.

The pressure vessels may have circular or oval cross sections. The individual pressure vessels can be designed as storage pipes. For example, a plurality of pressure vessels can be provided, the longitudinal axes of which run parallel to one another in the installed position. The individual pressure vessels may each have a length to diameter ratio with a value between 5 and 200, preferably between 7 and 100, and particularly preferably between 9 and 50. The length to diameter ratio is the quotient of the total length of the individual pressure vessels (for example total length of a storage pipe without fluidic connection elements) as the numerator and the largest outside diameter of the pressure vessel as the denominator. The individual pressure vessels may be directly adjacent to one another, for example at a distance from one another of less than 20 cm or less than 15 cm or less than 10 cm or less than 5 cm.

At least one pressure vessel of the plurality of pressure vessels is a reinforced pressure vessel. A reinforced pressure vessel can be, for example, a type 2, type 3 or type 4 pressure vessel. Expediently, the pressure vessel comprises an inner layer, as a rule referred to as a liner, and a fiber-reinforced layer which forms the reinforcement. The fiber-reinforced layer surrounds the inner layer and ensures that the pressure vessel withstands the pressure loads. It is also conceivable for no inner layer serving as a winding core to be provided. Expediently, long fibers are introduced in the fiber-reinforced layer. The fibers are advantageously carbon fibers, glass fibers and/or fibers made from Kevlar. A plastic resin is preferably used as the matrix material. The inner layer can be produced from metal (e.g. aluminum) or preferably from plastic (e.g. a polyamide). The fiber-reinforced layer is expediently provided at both ends and in the lateral surface region of the pressure vessel. In other words, a reinforced pressure vessel always comprises a reinforcement made from a fiber-reinforced material.

The pressure vessel comprises at least one fiber-reinforced layer. The fiber-reinforced layer can preferably completely surround a liner at least in certain regions. The fiber-reinforced layer is often also referred to as a laminate or jacket or reinforcement. The term "fiber-reinforced layer" is generally used below. As a rule, fiber-reinforced plastics, for example carbon fiber reinforced plastics and/or glass fiber reinforced plastics, are used as the fiber-reinforced layer. The fiber-reinforced layer expediently comprises reinforcing fibers embedded in a plastic matrix. In particular, the matrix material, and type and proportion of reinforcing fibers and the orientation thereof can be varied so that the desired mechanical and/or chemical properties are produced. Preferably, the reinforcing fibers which are used are endless fibers which can be applied by winding and/or braiding. As a rule, the fiber-reinforced layer has a plurality of laminated layers.

At least one other pressure vessel of the plurality of pressure vessels is a reinforcement-free pressure vessel. These reinforcement-free pressure vessels may also be referred to as steel vessels. A reinforcement-free pressure vessel is a pressure vessel which has no reinforcement, i.e. no fiber-reinforced layer. Instead, the wall of the reinforcement-free pressure vessel is generally produced from a metal material. Preferably, a high-strength steel forms the wall of the reinforcement-free pressure vessel.

The material of the wall of the reinforcement-free pressure vessel preferably comprises the following elements:
    0.3 to 0.5% carbon and/or
    0.6 to 1.5% chromium and/or
    0.5 to 1.0% manganese and/or
    0.2 to 0.75% molybdenum and/or
    1.5 to 2.15% nickel and/or
    1.35 to 1.9% silicon.

In particular, the material comprises the elements listed here with the appropriate ratio. The phosphorus content of the material is preferably max. 0.05%; additionally or alternatively, the sulfur content of the material is preferably max. 0.05%. Additionally or alternatively, the vanadium content of the steel is preferably max. 0.1%. The remaining proportion to reach 100% is substantially, preferably completely, iron. Such a steel is particularly readily suitable.

As a rule, a reinforcement-free pressure vessel has a smaller wall thickness than a reinforced pressure vessel. The reinforcement-free pressure vessel is as a rule heavier than a reinforced pressure vessel.

In the installed state, the longitudinal axes of the plurality of pressure vessels can run parallel to the longitudinal direction of the vehicle. Expediently, the at least one reinforced pressure vessel is then provided further away from a side sill of the motor vehicle than the at least one reinforcement-free pressure vessel. In other words, the at least one reinforced pressure vessel is therefore spaced apart further from the side sill than the reinforcement-free pressure vessel. Expediently, all of the reinforced pressure vessels of the pressure vessel system are spaced further apart from the side sill than all of the reinforcement-free pressure vessels of the pressure vessel system. Instead of the side sill, the body outer skin could also be referenced.

In the installed state, the longitudinal axes of the plurality of pressure vessels can run transversely with respect to the longitudinal direction of the vehicle (as a rule in the transverse direction of the vehicle), wherein then the at least one reinforced pressure vessel is provided further away from a wheel axis of the motor vehicle than the at least one reinforcement-free pressure vessel. In other words, the reinforcement-free pressure vessels preferably lie further on the outside than the reinforced pressure vessels. The plurality of pressure vessels are preferably provided in one plane in the underfloor region, and the outer pressure vessels (i.e. at least the outermost on each side) are advantageously reinforcement-free pressure vessels.

This has the advantage that the pressure vessel system as a whole has better crash behavior. The background is that the reinforcement-free pressure vessels are less susceptible to intrusion. The reinforcement-free pressure vessels expediently have better crash behavior and better behavior during intrusion or impaction by further bodies than the reinforced pressure vessels. For example, the reinforcement-free pressure vessels can withstand greater intrusion or greater impaction without bursting than the reinforced pressure vessels.

At least one fire-retardant and preferably intumescent layer can be provided for thermally protecting the reinforced pressure vessels. The fire-retardant layer can be applied, for example, to each reinforced pressure vessel. The fire-retardant layer is preferably provided only on or directly adjacent to the reinforced pressure vessels, for example on the floor panel. Intumescent layers for fire protection are known as such. If a triggering temperature is exceeded, they increase in size to retard the fire. Expediently, the fire-retardant layer is provided in such a manner that it does not protect the reinforcement-free pressure vessels. For example, such a fire-retardant layer may not be applied to the at least one reinforcement-free pressure vessel. Such a fire-retardant layer may also not be provided on the floor panel which covers the reinforcement-free pressure vessels. The production costs can therefore advantageously be reduced without the system safety thereby suffering. The background is that the reinforcement-free pressure vessels have improved thermal failure behavior in comparison to the reinforced pressure vessels.

Expediently, a floor plate is provided between the plurality of pressure vessels and the carriageway. Such a floor plate serves primarily to protect the pressure vessel system against weather influences and against intrusion, for example. The floor plate may belong, for example, to the pressure vessel assembly and be mounted together therewith. Alternatively, the floor plate may also be a separate plate. It can be formed in a single layer or in multiple layers and can also comprise structure-reinforcing elements. A first region of the floor plate that at least partially and preferably entirely covers the reinforced pressure vessels can be formed from a different material or from a different layered structure from a second region of the floor plate that at least partially and preferably entirely covers the reinforcement-free pressure vessels. Advantageously, the first region is formed from a metal material and particularly preferably from steel. A metal plate (preferably steel plate) under the reinforced pressure vessels has the advantage that metal does not melt at fire temperatures. As a result, the fire does not come directly to the tank surface. Furthermore, the intrusion protection is improved. Advantageously, the second region is produced from a plastics material or from a light metal which has a lower specific weight than the metal material of the first region. Expediently, the floor plate comprises (i) an outer, preferably annular region, which substantially covers the reinforcement-free pressure cylinders and the ends of the pressure vessels, and (ii) an inner region which substantially covers the reinforced pressure cylinders. Advantageously, a safe and simultaneously weight-optimized tank system can therefore be produced.

The movable bearing of the reinforced pressure vessel can advantageously be formed differently from the movable bearing of the reinforcement-free pressure vessel. The movable bearing of the reinforced pressure vessel can be designed to compensate for a larger, operationally induced lengthening of the pressure vessels in comparison to the movable bearing of the reinforcement-free pressure vessel. Expediently, a plurality of reinforced pressure vessels can be supported by a common movable bearing. Therefore, a cost-effective system can be realized. Advantageously, pressure vessels lengthening differently can therefore be optimally supported.

In one refinement, the pressure vessels are connected in parallel. A common fuel line, preferably an integral distributor pipe or fuel rail, can be provided here. The plurality of pressure vessels are generally connected directly to the distributor pipe without a respectively dedicated, externally electrically actuable shut-off valve being provided between the fuel line and the individual pressure vessels.

Expediently, a common tank shut-off valve is provided on a common fuel line, wherein the common fuel line fluidically connects the plurality of pressure vessels to one another without interruption, and wherein the tank shut-off valve is provided in the central region of the fuel line.

Particularly preferably, a common fuel line connects the plurality of pressure vessels to one another. The fuel line can be provided in particular upstream of the (high-pressure) pressure reducer. The fuel line is expediently designed to substantially withstand the same pressures as or higher pressures than the pressure vessels which are connected to the fuel rail. The individual pressure vessels of the pressure vessel assembly are fluidically connected directly to one another via the fuel line such that, in the state as intended, the individual pressure vessels have substantially the same pressure, in accordance with the principle of communicating pipes. In other words, the plurality of pressure vessels are generally connected directly to the fuel line without a respectively dedicated, externally electrically actuable shut-off valve being provided between the fuel line and the individual pressure vessels. The plurality of pressure vessels are advantageously connected in an integrally bonded manner (by way of adhesive bonding, welding and/or soldering) to the common fuel line such that the individual pressure vessels are not releasable from the distributor pipe without being destroyed. The connecting line can also serve to mechanically couple the individual pressure vessels and possibly to form common body attachment points.

The fuel line can comprise a plurality of separate line portions which connect the plurality of pressure vessels to one another. In a preferred refinement, an integral fuel line produces the fluid connection between at least three pressure vessels or all of the pressure vessels. Such a fuel line may also be referred to as a distributor pipe, as a fuel rail or as a high-pressure fuel rail. In principle, such a fuel rail can be formed similarly to a high-pressure injection rail of an internal combustion engine. Preferably, a single integral pipe or a single integral block or a single housing forms the fuel rail. Expediently, the fuel rail comprises a plurality of rail connections for the direct connection of the pressure vessels. Advantageously, the individual rail connections are provided directly on the rail housing or block or pipe and/or are all at the same distance from one another. Such a fuel rail is disclosed, for example, in the German patent applications with the application numbers DE 10 2020 128 607.4 and DE 10 2020 123 037.0, the content of which in respect of the configuration of the fuel rail (also called distributor pipe or rail) and the attachment of the pressure vessels is hereby also incorporated by reference. Alternatively, the fuel rail can be designed as a metal block, as is disclosed, for example, in the document DE 602017034685 D1.

The fuel rail may be substantially flexurally rigid. In this context, flexurally rigid means that the fuel rail is rigid against distortion or that, during the functional use of the fuel rail, only a distortion which is unnoticeable and insignificant for the function arises. In an alternative refinement, the fuel rail may be designed in such a manner that the fuel rail can compensate for positional changes in the pressure vessels, and in particular of the connection pieces thereof. Positional changes are deviations between an actual position of the pressure vessels (during operation, during production, during service use or other situations) and a desired position assumed during the design. Positional changes result, for example, because of the expansion of the components (e.g. the pressure vessels) due to internal pressure changes and/or temperature changes. Furthermore, positional changes (positional deviations) may occur because of manufacturing tolerances. The fuel rail can be designed to permit compensation for tolerances perpendicularly to the pressure vessel longitudinal axes of the pressure vessel system. The fuel line or the fuel rail and generally also the shut-off valve described below are advantageously part of the pressure vessel assembly.

In this context, a fuel line is very generally a flow path which can be formed through (at least) one pipeline or else through (at least) one line channel provided in a block.

An electrically actuable and normally closed tank shut-off valve that is fluidically connected to the pressure vessel assembly and to the fuel line can be provided and is designed to shut off the plurality of pressure vessels or the fuel line in relation to the other fuel-conducting lines of the fuel supply system leading to the energy converter. This shut-off valve has the function of an on-tank valve of a conventional pressure vessel. Expediently, just one normally closed shut-off valve is provided. The shut-off valve is expediently screwable directly onto or into the pressure vessel assembly or the distributor pipe. The shut-off valve is the first valve which is provided downstream of each of the pressure vessels connected to the common fuel line. A pipe rupture safety device, also called an excess flow valve, can be provided on each pressure vessel or on the distributor pipe.

The pressure relief is the process by which the pressure in the pressure vessel is reduced due to an event. The event is in particular an incident rather than the intended extraction for supplying an energy converter. The pressure relief begins generally with the at least partial opening of a valve and/or a bursting element which is directly fluidically connected to the pressure vessel. The pressure relief can preferably take place by way of at least one pressure relief device of the pressure vessel system. The pressure relief device may be a thermally activatable pressure relief device. The thermally activatable pressure relief device, also called thermal pressure relief device (TPRD), such as a thermal fuse, is as a rule provided adjacent to the pressure vessel. Under the action of heat (e.g. due to flames), the fuel stored in the pressure vessel is let out into the surroundings by the TPRD. The pressure relief device lets out the fuel as soon as the triggering temperature of the TPRD is exceeded (=is thermally activated). Preferably, a TPRD is provided on at least one pressure vessel at an end which lies opposite the fuel line. Expediently, such TPRDs are provided at the opposite ends of at least two spaced-apart pressure vessels. In one refinement, the TPRDs are each provided on the reinforcement-free pressure vessels. These pressure vessels are generally produced from a metal material. If a local flame acts on these pressure vessels, the pressure vessel relatively readily conducts the heat to the TPRD which therefore triggers promptly. In another refinement, the TPRDs are provided on two spaced-apart reinforced pressure vessels. Alternatively, it is conceivable that just one TPRD is provided at the opposite end, preferably on a pressure vessel arranged in or adjacent to the center of the pressure vessel system. Alternatively or additionally, it is conceivable that a respective TPRD is provided centrally on the fuel line and/or at both ends of the fuel line.

Particularly preferably, the tank shut-off valve, the TPRD and/or an overpressure protection valve can be provided in a common housing or in a common block. Therefore the number of possible leakage points reduces and the integration of the components can be increased.

At least one pressure vessel can comprise at least one barrier layer. The barrier layer serves for reducing and preferably for avoiding permeation of fuel. The barrier layer is therefore designed at least to reduce, and preferably substantially entirely to prevent, the escape of fuel stored in the internal volume into the pressure vessel wall and/or to the surroundings. For example, the barrier layer can be designed so as, of the three permeation-determining partial steps of sorption, diffusion and desorption, specifically to make diffusion difficult. For this purpose, the barrier layer can provide as small a free volume as possible, i.e., for example in the case of polymers, only little free space between the molecule chains. In general, a higher filling content or a high crystallinity of a thermoplastic and a high degree of cross-linking in the case of elastomers and thermosetting plastics inhibit the diffusion. Expediently, the barrier layer surrounds at least 70% or at least 90% or at least 99% of the internal volume. A surface coating can advantageously form the barrier layer. The barrier layer may be formed as a metal layer, in particular from aluminum, steel and/or copper and alloys thereof. The barrier layer may alternatively be produced from a fuel-blocking plastic, e.g. ethylene-vinyl alcohol copolymer (EVOH). Preferably, the barrier layer has a layer thickness of approx. 0.001 mm to 0.2 mm and particularly preferably between approx. 0.005 mm and 0.1 mm.

In other words, the technology disclosed here relates to a flat storage system with a plurality of pressure vessels which in each case generally have a maximum diameter in the lateral surface region that is smaller than 250 mm or than 175 mm or than 150 mm or than 120 mm. According to the technology disclosed here, reinforced pressure vessels (also called CFRP tanks) are constructed in mixed form with non-reinforced or reinforcement-free pressure vessels (generally steel tanks). The pressure vessel system therefore comprises differently constructed pressure vessels. Particularly preferably, the steel tanks are provided directly adjacent to the side sill and preferably on the outer side of the protected width of an underfloor region of a motor vehicle, the components in the protected width being safe from a side crash. Advantageously, the robustness against a side crash can therefore be improved since the steel tanks can absorb more impact energy than conventional CFRP tanks. Preferably, a valve block distributor is provided in the center of the fuel line (also called rail system or pipe system). If such a pressure vessel system is refilled, a comparatively large amount of heat arises in the outer tanks because of compression processes. If the outer pressure vessels are steel tanks, they can comparatively readily temporarily store the heat because of the excellent heat capacity of metal, and the fuel in these steel tanks does not become too hot. Furthermore, steel tanks are also more favorable in respect of their storage volume and recyclability. On the other hand, CFRP tanks are lighter than steel tanks. With the technology disclosed here, a pressure vessel system which is improved in respect of storage volume, weight, construction space requirements, costs and recyclability is provided.

BRIEF DESCRIPTION OF THE DRAWING

FIG. 1 shows a schematic view of a motor vehicle according to an embodiment of the present disclosure.

DETAILED DESCRIPTION OF THE DRAWING

The technology disclosed here will now be explained with reference to schematic FIG. 1 which shows a schematic view of a motor vehicle. The front wheels and the rear wheels are each arranged here on common wheel axes A. The term wheel axis does not mean the physical component here, but rather the connecting line between the two front wheels or the two rear wheels. The body outer skin K is shown here in greatly simplified form by dashed lines. The pressure vessel system is provided here in the underfloor region. It is provided below the passenger compartment and substantially between the wheel axes A and the side sills 410. The pressure vessel system 100 here comprises a plurality of pressure vessels 110, 120. Here, 8 pressure vessels 110, 120 are illustrated. However, there could also be a greater or smaller number of pressure vessels.

The pressure vessels 110, 120 are oriented here parallel to the longitudinal direction of the vehicle. The pressure vessels 110, 120 lie in one plane here. The two outer pressure vessels 110 here are reinforcement-free pressure vessels 110. Expediently, steel tanks could be constructed here. Reinforced pressure vessels 120 are provided here between the reinforcement-free pressure vessels 110. Consequently, the reinforced pressure vessels 120 are at a greater distance from the side sills on the same side than the reinforcement-free pressure vessels 110. A plate or plate profile is arranged on each side between the pressure vessels 120 and the outer reinforcement-free pressure vessels 110. This plate or plate profile is generally a longitudinal member and serves as further impact protection in the event of a side crash. In the unlikely case that a side crash actually causes deformation as far as the outer reinforcement-free pressure vessels 110, these pressure vessels 110, which are generally produced from metal, are less sensitive to mechanical loading. Therefore, side crashes can be withstood even better. Each of the plurality of pressure vessels 110, 120 is connected at one end to the fuel line 130. The fuel line 130 can preferably be designed as a fuel rail. Such a configuration reduces the number of parts and the number of closure points which could cause leakages. The tank shut-off valve 140 is provided here in the center of the fuel line 130 and is integrated here in a valve distributor block. Expediently, a TPRD and/or an overpressure protection valve can also be integrated in this valve distributor block. The tank shut-off valve 140 or the valve distributor block is fluidically connected here to a tank coupling. The fluid connection to the energy converter, e.g. to a fuel cell system, has been omitted here for simplification. Further TPRDs which may alternatively or additionally be provided are likewise not shown. The region B here designates the width which, according to the design of the body, is not intruded in the event of a side crash. It is apparent that the pressure vessel system is protected against a side impact.

The case is illustrated here in which the pressure vessels are installed in the longitudinal direction of the vehicle. Alternatively, it is conceivable that the pressure vessels are installed in the motor vehicle in the transverse direction of the vehicle. The outer reinforcement-free pressure vessels are then arranged closer to the wheel axes than the centrally provided, reinforced pressure vessels.

For reasons of readability, the term "at least one" has been partially omitted for simplification. If a feature of the technology disclosed herein is described in the singular or with an indefinite article (for example, the/a reinforced pressure vessel, the/a reinforcement-free pressure vessel, etc.), a plurality thereof is also intended to be disclosed at the same time (for example, the at least one reinforced pressure vessel, the at least one reinforcement-free pressure vessel, etc.).

In the context of the technology disclosed herein, the term "substantially" (for example "substantially perpendicular axis") includes the exact property or the exact value (for example "perpendicular axis") and deviations that are irrelevant for the function of the property/of the value (for example "tolerable deviation from perpendicular axis").

The description of the present disclosure given above serves only for illustrative purposes and not for the purposes of limiting the disclosure. Various changes and modifications are possible within the context of the disclosure without departing from the scope of the disclosure and its equivalents.

The invention claimed is:

1. A pressure vessel system for a motor vehicle, comprising:
a plurality of pressure vessels for storing fuel, wherein at least one pressure vessel of the plurality of pressure vessels is a reinforced pressure vessel, wherein at least one other pressure vessel of the plurality of pressure vessels is a reinforcement-free pressure vessel, and wherein:
(i) the at least one reinforced pressure vessel is provided further away from a side sill of the motor vehicle than the at least one reinforcement-free pressure vessel, or
(ii) the at least one reinforced pressure vessel is provided further away from a wheel axis of the motor vehicle than the at least one reinforcement-free pressure vessel,
wherein a floor plate is provided between the plurality of pressure vessels and a carriageway, and wherein a first region of the floor plate that at least partially covers the reinforced pressure vessel is formed from a different material or from a different layered structure from a second region of the floor plate that at least partially covers the reinforcement-free pressure vessel.

2. The pressure vessel system according to claim 1, wherein the plurality of pressure vessels are provided in one plane, and wherein the outer pressure vessels are reinforcement-free pressure vessels.

3. The pressure vessel system according to claim 1, wherein at least one fire-retardant and/or intumescent layer is provided for thermally protecting the reinforced pressure vessels only on or directly adjacent to the reinforced pressure vessels.

4. The pressure vessel system according to claim 1, wherein the plurality of pressure vessels are connected to one another via a common fuel rail, and wherein the plurality of pressure vessels are provided in the underfloor region of the motor vehicle.

5. The pressure vessel system according to claim 1, wherein the reinforcement-free pressure vessels have better crash behavior and/or withstand a greater intrusion without bursting than the reinforced pressure vessels.

6. A motor vehicle comprising a pressure vessel system according to claim 1.

7. A pressure vessel system for a motor vehicle, comprising:
a plurality of pressure vessels for storing fuel, wherein at least one pressure vessel of the plurality of pressure vessels is a reinforced pressure vessel, wherein at least one other pressure vessel of the plurality of pressure vessels is a reinforcement-free pressure vessel, and wherein:
(i) the at least one reinforced pressure vessel is provided further away from a side sill of the motor vehicle than the at least one reinforcement-free pressure vessel, or
(ii) the at least one reinforced pressure vessel is provided further away from a wheel axis of the motor vehicle than the at least one reinforcement-free pressure vessel,
wherein a movable bearing of the reinforced pressure vessel is formed differently from a movable bearing of the reinforcement-free pressure vessel, and
wherein a plurality of reinforced pressure vessels are supported by a common movable bearing.

8. A pressure vessel system for a motor vehicle, comprising:
a plurality of pressure vessels for storing fuel, wherein at least one pressure vessel of the plurality of pressure vessels is a reinforced pressure vessel, wherein at least one other pressure vessel of the plurality of pressure vessels is a reinforcement-free pressure vessel, and wherein:
(i) the at least one reinforced pressure vessel is provided further away from a side sill of the motor vehicle than the at least one reinforcement-free pressure vessel, or
(ii) the at least one reinforced pressure vessel is provided further away from a wheel axis of the motor vehicle than the at least one reinforcement-free pressure vessel,
wherein a common tank shut-off valve is provided on a common fuel line, wherein the common fuel line fluidically connects the plurality of pressure vessels to one another without interruption, and wherein the tank shut-off valve is provided in the central region of the fuel line.

9. A pressure vessel system for a motor vehicle, comprising:
a plurality of pressure vessels for storing fuel, wherein at least one pressure vessel of the plurality of pressure vessels is a reinforced pressure vessel, wherein at least one other pressure vessel of the plurality of pressure vessels is a reinforcement-free pressure vessel, and wherein:
(i) the at least one reinforced pressure vessel is provided further away from a side sill of the motor vehicle than the at least one reinforcement-free pressure vessel, or
(ii) the at least one reinforced pressure vessel is provided further away from a wheel axis of the motor vehicle than the at least one reinforcement-free pressure vessel,
wherein thermal pressure relief devices are provided only on reinforcement-free pressure vessels.

* * * * *